(12) United States Patent
Lehr et al.

(10) Patent No.: US 9,195,597 B2
(45) Date of Patent: *Nov. 24, 2015

(54) AVOIDING RECALL OPERATIONS IN A TIERED DATA STORAGE SYSTEM

(71) Applicant: International Business Machines Corporation, Armonk, NY (US)

(72) Inventors: Douglas L. Lehr, Austin, TX (US); Franklin E. McCune, Tucson, AZ (US); David C. Reed, Tucson, AZ (US); Max D. Smith, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/074,621

(22) Filed: Nov. 7, 2013

(65) Prior Publication Data

US 2014/0068185 A1     Mar. 6, 2014

Related U.S. Application Data

(63) Continuation of application No. 12/985,294, filed on Jan. 5, 2011, now Pat. No. 8,621,170.

(51) Int. Cl.
*G06F 12/08* (2006.01)
*G06F 3/06* (2006.01)
*G06F 17/30* (2006.01)

(52) U.S. Cl.
CPC .............. *G06F 12/08* (2013.01); *G06F 3/061* (2013.01); *G06F 3/0649* (2013.01); *G06F 3/0685* (2013.01); *G06F 17/30221* (2013.01); *G06F 3/067* (2013.01)

(58) Field of Classification Search
CPC ....... G06F 3/0649; G06F 3/067; G06F 12/02; G06F 12/08; G06F 3/061; G06F 3/0685; G06F 3/0608; G06F 3/0665; G06F 17/30067
See application file for complete search history.

(56) References Cited

U.S. PATENT DOCUMENTS

| 7,536,526 | B2 | 5/2009 | Srinivasan et al. |
| 7,581,061 | B2 | 8/2009 | Miyagaki et al. |
| 7,631,022 | B2 | 12/2009 | Hasegawa et al. |
| 7,822,939 | B1 | 10/2010 | Veprinsky et al. |
| 8,621,170 | B2 | 12/2013 | Lehr et al. |

(Continued)

OTHER PUBLICATIONS

Non-Final Office Action from U.S. Appl. No. 12/985,294 dated Apr. 26, 2013.
Notice of Allowance and Fee(s) Due from U.S. Appl. No. 12/985,294 dated Aug. 19, 2013.

*Primary Examiner* — Mardochee Chery
(74) *Attorney, Agent, or Firm* — Zilka-Kotab, PC

(57) ABSTRACT

According to one embodiment, a system for recalling a data set, includes logic integrated with and/or executable by a hardware processor, the logic being configured to receive a request to open a data set, determine whether the requested data set is stored to a lower tier of a tiered data storage system in multiple associated portions or to a higher tier of the tiered data storage system, move each associated portion of the requested data set from the lower tier to the higher tier of the tiered data storage system when at least one portion of the requested data set is stored to the lower tier of the tiered data storage system, and assemble the associated portions of the requested data set into a single data set to form the requested data set on the higher tier of the tiered data storage system.

20 Claims, 5 Drawing Sheets

(56) References Cited

U.S. PATENT DOCUMENTS

2009/0254575 A1 10/2009 Kravets
2010/0185690 A1 7/2010 Evans et al.
2011/0282830 A1* 11/2011 Malige et al. ................ 707/609
2012/0173833 A1 7/2012 Lehr

* cited by examiner

AVOIDING RECALL OPERATIONS IN A TIERED DATA STORAGE SYSTEM

RELATED APPLICATIONS

This application is a continuation of copending U.S. patent application Ser. No. 12/985,294, filed Jan. 5, 2011, which is herein incorporated by reference.

BACKGROUND

The present invention relates to avoiding recall operations on a tiered data storage system, and more particularly, to a system, method, and computer program product for avoiding recall operations when writing new data to files on a tiered data storage system.

Using conventional space management techniques on a tiered data storage system, data is often migrated from one tier of storage to another tier of storage. Generally, data is stored initially on a higher-cost, more available data storage tier, that uses storage media such as direct access storage devices (DASD). At some point, the stored data may be moved to a lower-cost data storage tier that uses lower-cost storage media such as magnetic tape. If the data is moved from the lower-cost data storage tier back to the higher-cost data storage tier, the operation to move the data is referred to as a "recall."

When an application, system, routine, etc., has data to update a file with, and that file is stored on the lower-cost data storage tier, that file (data set) must be moved from the lower-cost data storage tier to the higher-cost data storage tier (recalled), so that an update can take place. Once the data set to be updated is on the higher-cost data storage tier, the new data may be written into the data set. With some access methods and/or types of updates, the new data may be placed at the end of the data set. In this case, the data set is recalled and information in the data set does not necessarily need to be read; instead, the new data is simply appended to the end of the data set. Then, the updated data set can be moved back to the lower-cost data storage tier if it meets space management criteria after the update. This wasted I/O causes unnecessary system overhead and causes delays in other job execution. It also causes additional overhead when the updated data set is moved back to the lower-cost data storage tier after updating is complete.

BRIEF SUMMARY

According to one embodiment, a system for recalling a data set, includes logic integrated with and/or executable by a hardware processor, the logic being configured to receive a request to open a data set, determine whether the requested data set is stored to a lower tier of a tiered data storage system in multiple associated portions or to a higher tier of the tiered data storage system, move each associated portion of the requested data set from the lower tier to the higher tier of the tiered data storage system when at least one portion of the requested data set is stored to the lower tier of the tiered data storage system, and assemble the associated portions of the requested data set into a single data set to form the requested data set on the higher tier of the tiered data storage system.

In another embodiment, a method for recalling a data set includes receiving a request to open a data set, determining whether the requested data set is stored to a lower tier of a tiered data storage system in multiple associated portions or to a higher tier of the tiered data storage system, moving each associated portion of the requested data set from the lower tier to the higher tier of the tiered data storage system when at least one portion of the requested data set is stored to the lower tier of the tiered data storage system, and assembling the associated portions of the requested data set into a single data set to form the requested data set on the higher tier of the tiered data storage system.

In another embodiment, a computer program product for recalling a data set includes a computer readable storage medium having program code embodied therewith, the program code readable and/or executable by a processor to receive a request to open a data set, determine whether the requested data set is stored to a lower tier of a tiered data storage system in multiple associated portions or to a higher tier of the tiered data storage system, move each associated portion of the requested data set from the lower tier to the higher tier of the tiered data storage system when at least one portion of the requested data set is stored to the lower tier of the tiered data storage system, and assemble the associated portions of the requested data set into a single data set to form the requested data set on the higher tier of the tiered data storage system.

Other aspects and embodiments of the present invention will become apparent from the following detailed description, which, when taken in conjunction with the drawings, illustrates by way of example the principles of the invention.

DETAILED DESCRIPTION

Figure 1:
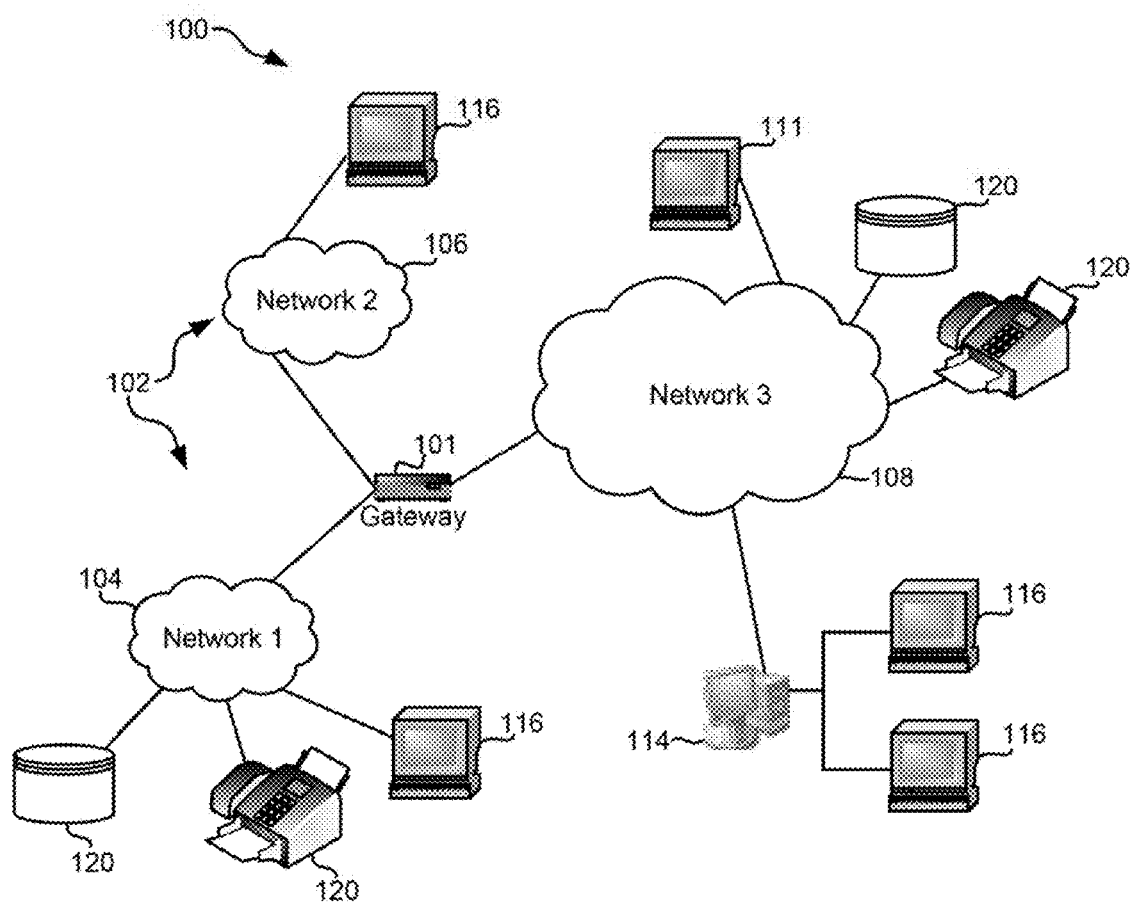
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In some approaches, data may be stored in a tiered data storage system in a format which allows for new data to be appended to an end of an existing data set. In implementations of this type of data storage, the existing data set may be moved from a lower-cost data storage tier up to a higher-cost data storage tier in order to write the new data to the end of the existing data set. After being updated, the data set may then be moved back down to the lower-cost data storage tier.

However, in one embodiment, in order to reduce costs and time associated with migrating data up and down between the tiers of the tiered data storage system, the existing data set may not be moved from the lower-cost data storage tier to the higher-cost data storage tier to access it, since the new data may be added to the end of the existing data set in a manner which does not require the existing data set to be moved.

In this embodiment, a determination may be made when a request is received to open the existing data set as to whether updates (new data) are going to be placed at the end of the existing data set (such as a file) based on a type of the data set and an indicator that may be received with the open request or from another source when the open request is received. If new data is going to be written to the end of the existing data set, the existing data set may not be recalled; instead, a temporary data set is created to store the new data (records) on the higher-cost data storage tier (first tier). When write activity for the new data completes and a close is issued, the temporary data set may be migrated to a lower-cost data storage tier (lower tier), either immediately or at some other time. The migration control data set may then be updated to reflect the two portions of the updated data set (or more portions if this process is repeated more than once). When the data set is eventually recalled for read processing and/or non-add to end processing, a space may be allocated to hold all portions of the updated data set on the higher-cost data storage tier. All portions are then merged into a single data set during the recall on the higher-cost data storage tier.

According to one general embodiment, a system for recalling a data set, includes logic integrated with and/or executable by a hardware processor, the logic being configured to receive a request to open a data set, determine whether the requested data set is stored to a lower tier of a tiered data storage system in multiple associated portions or to a higher tier of the tiered data storage system, move each associated portion of the requested data set from the lower tier to the higher tier of the tiered data storage system when at least one portion of the requested data set is stored to the lower tier of the tiered data storage system, and assemble the associated portions of the requested data set into a single data set to form the requested data set on the higher tier of the tiered data storage system.

In another general embodiment, a method for recalling a data set includes receiving a request to open a data set, determining whether the requested data set is stored to a lower tier of a tiered data storage system in multiple associated portions or to a higher tier of the tiered data storage system, moving each associated portion of the requested data set from the lower tier to the higher tier of the tiered data storage system when at least one portion of the requested data set is stored to the lower tier of the tiered data storage system, and assembling the associated portions of the requested data set into a single data set to form the requested data set on the higher tier of the tiered data storage system.

In another general embodiment, a computer program product for recalling a data set includes a computer readable storage medium having program code embodied therewith, the program code readable and/or executable by a processor to receive a request to open a data set, determine whether the requested data set is stored to a lower tier of a tiered data storage system in multiple associated portions or to a higher tier of the tiered data storage system, move each associated portion of the requested data set from the lower tier to the higher tier of the tiered data storage system when at least one portion of the requested data set is stored to the lower tier of the tiered data storage system, and assemble the associated portions of the requested data set into a single data set to form the requested data set on the higher tier of the tiered data storage system.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory and/or non-volatile computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), a digital versatile disc read-only memory (DVD-ROM), a Blu-ray disc read-only memory (BD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), a storage area network (SAN), etc., or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, a SAN, a PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network. In one embodiment, peripheral 120 may be an IBM Scaled Out Network Attached Storage (SoNAS). In another embodiment, peripheral 120 may be an IBM System Storage TS7650 ProtecTIER Deduplication Appliance. In yet another embodiment, peripheral 120 may be an IBM System Storage TS3500 Tape Library.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
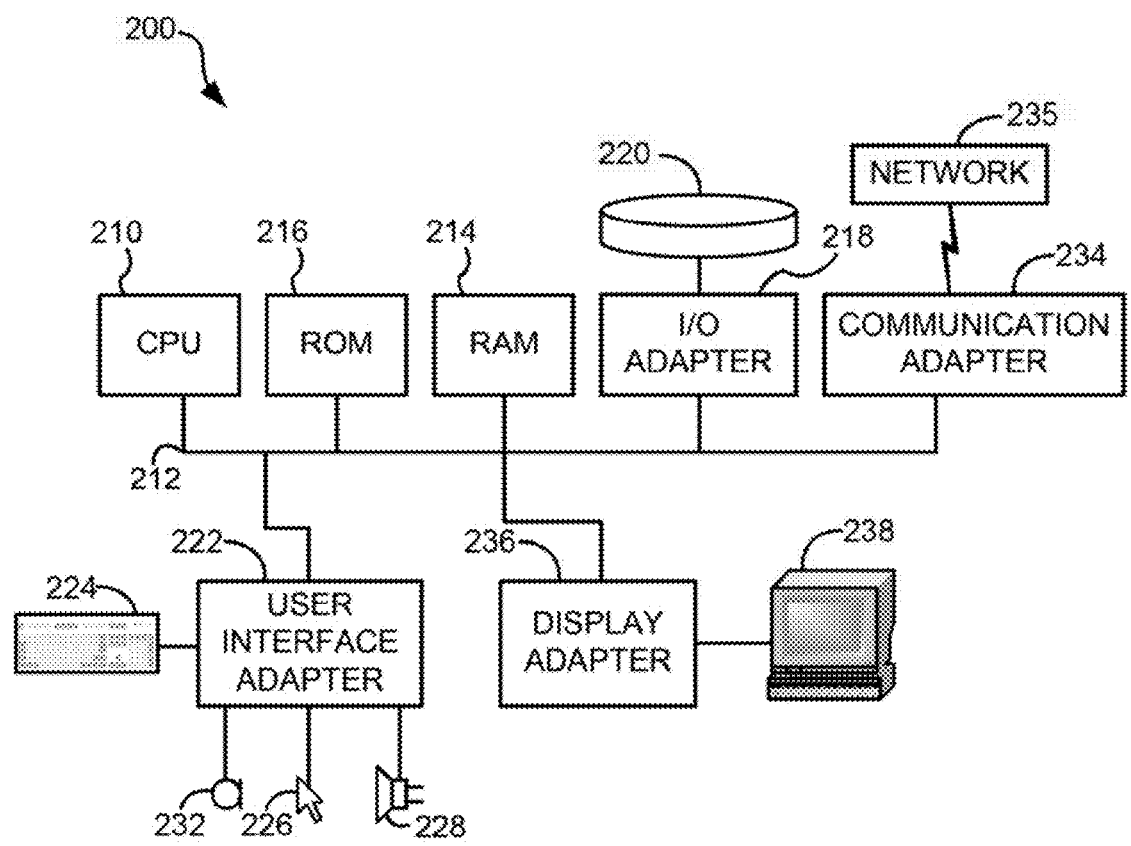
FIG. 2 shows a representative hardware environment that may be associated with the servers and/or clients of FIG. 1, in accordance with one embodiment.

FIG. 2 shows a representative hardware environment 200 associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238. In various embodiments, communication adapter 234 may be chosen from any of the following types: Ethernet, Gigabit Ethernet, Fibre Channel (FC), Fibre Channel over Ethernet (FCoE), Small Computer System Interface (SCSI), Internet Small Computer System Interface (iSCSI), and the like.

The workstation may have resident thereon an operating system such as the MICROSOFT WINDOWS Operating System (OS), a MAC OS, a UNIX OS, an IBM z/OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

As alluded to above, in tiered data storage systems which use file and/or storage types which allow for adding information to the end of data sets, any new data may simply be appended to the end of the existing data set, and the existing data set may be moved up to a higher-cost data storage tier in order to write the new data to the end of the existing data set or may remain on a lower-cost data storage tier and a new data set may be created on the higher-cost data storage tier, which is associated with the existing data set.

There are several different types of access methods which add data to the end of a file. For example, a Partitioned Data Set (PDS) always adds updates to the end of the data set. Physical sequential files also add new update data to the end of an existing data set. Other files like virtual storage access method (VSAM) files may add data to the end of the data set depending on the type of data set and type of records being added. When an application opens a file, it indicates whether it is opening the file for read or write access. For those opens where both read and write access are indicated by an open with write or for those data set types where a write may not go to the end of the data set, an additional indicator is added to open, to allow a parameter indicating "add to end" for write.

With conventional logic, a status indicator exists to inform the data manager whether a data set is on the higher tier or lower tier. This status indicator may be set to MIGRAT status when the data set is on the lower tier, indicating that it has a "migrated" status. When a data set is detected to be in MIGRAT status (migrated) during open, a recall is issued to bring the data set out of MIGRAT status.

According to one embodiment, a system includes logic adapted for not issuing the recall operation if the open is for a type of update that occurs only to the end of the data set. Instead, the system includes logic adapted for creating a temporary data set having attributes that match an existing data set to be updated, except that a catalog entry associates the new data set with the existing (migrated) data set. When the application, program, system, etc. writes the new data, it is written to the temporary data set and not to the existing data set. When the updates are complete, the application, program, system, etc., issues a close operation, of a type that would be apparent to one of skill in the art upon reading the present descriptions. During the close operation, a check is performed to determine if an association exists with a migrated data set. If it does, then the temporary data set is immediately migrated to the lower tier and the association is maintained on the lower tier.

In this embodiment, there are now two portions of the data set which are in MIGRAT status. The existing data set, and the new, updated portion of the data set. The migration control data set may then be updated when the migration of the temporary data set completes to show the second portion of the data set as an extension of the original migrated data set. Subsequent updates may create additional extensions. When the data set is eventually accessed for read or for an update that cannot be appended to the end, all portions of the data set may be recalled and combined to form one data set on the higher tier. Space is allocated to accommodate all portions of the migrated data set, and the data set is then recalled into a single data set. The data set now exists on the higher tier just as any other recalled data set.

Figure 3:
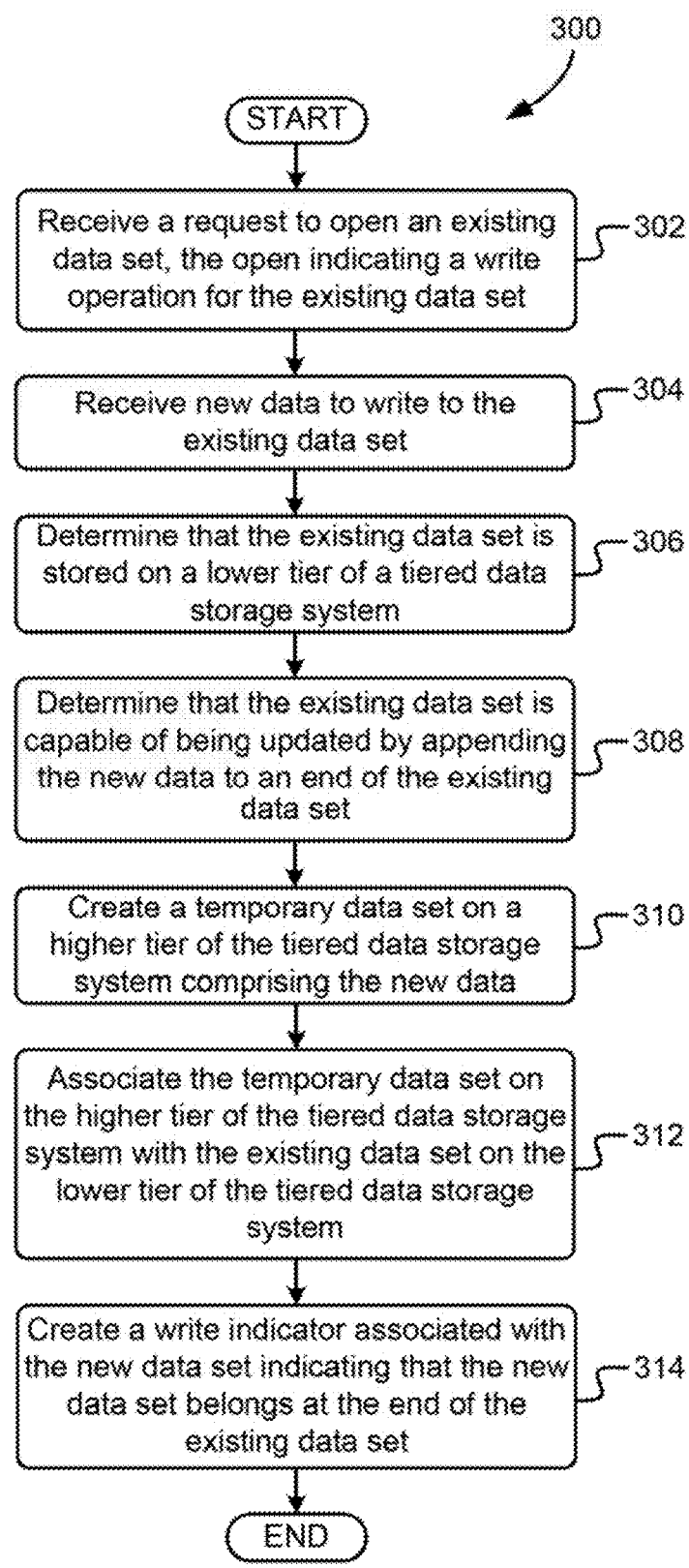
FIG. 3 is a flow diagram of a method for updating a data set on a tiered data storage system, according to one embodiment.

Now referring to FIG. 3, a method 300 is shown for updating a data set on a tiered data storage system, according to one embodiment. Of course, the method 300 may include more or fewer operations than those described below and shown in FIG. 3, as would be apparent to one of skill in the art upon reading the present descriptions. Also, the method 300 may be performed in any desired environment, and may involve systems, components, etc., as described in regard to FIGS. 1-2, and 5 among others.

In one embodiment, the method 300 may be executed on a host system, a device, a management server, a library manager, etc., or any other system, server, application, or device as would be apparent to one of skill in the art upon reading the present descriptions.

In another approach, the method 300 may be performed by a system and/or a computer program product.

In operation 302, a request to open an existing data set is received, the open indicating a write operation for the existing data set.

In operation 304, new data to write to the existing data set is received.

In operation 306, it is determined that the existing data set is stored on a lower tier of a tiered data storage system. In one embodiment, this may be accomplished by determining that a status indicator associated with the existing data set is set to migrated status, e.g., MIGRAT. Of course, any other technique may be used to determine the location of the existing data set, as would be apparent to one of skill in the art upon reading the present descriptions.

In operation 308, it is determined that the existing data set is capable of being updated by appending the new data to an end of the existing data set. In one embodiment, this may be accomplished by determining that an indicator associated with the existing data set indicates that the existing data set is capable of adding new data to an end of the existing data set. Of course, any other technique may be used to determine the write conditions for the existing data set, as would be apparent to one of skill in the art upon reading the present descriptions.

In one approach, the existing data set may be one of: a partitioned data set (PDS), a physical sequential file, or a virtual storage access method (VSAM) file, e.g., data file of a type capable of being appended with new data to an end of the file.

In operation 310, a temporary data set is created on a higher tier of the tiered data storage system comprising the new data.

In operation 312, the temporary data set on the higher tier of the tiered data storage system is associated with the existing data set on the lower tier of the tiered data storage system.

In operation 314, a write indicator associated with the new data set is created indicating that the new data set belongs at the end of the existing data set.

According to one embodiment, the method 300 may further include migrating the temporary data set to the lower tier of the tiered data storage system while maintaining the association with the existing data set. This operation may be carried out immediately or as soon as possible, in one preferred embodiment, or at any time, according to various other embodiments, such as after the temporary data set satisfies migration criteria, after the temporary data set has not been used for a period of time, if the existing data set is migrated down, etc.

In a preferred embodiment, method 300 may be carried out with the proviso that the existing data set is not moved to the higher tier of the tiered data storage system in order to write the new data.

Of course, as previously mentioned, the method 300 may be embodied in a system and/or a computer program product.

In one such embodiment, a system for updating an existing data set on a tiered data storage system includes logic adapted to receive a request to open an existing data set, the open indicating a write operation for the existing data set, logic adapted to receive new data to write to the existing data set, logic adapted to determine that the existing data set is stored on a lower tier of a tiered data storage system, logic adapted to determine that the existing data set is capable of being updated by appending the new data to an end of the existing data set, logic adapted to create a temporary data set on a higher tier of the tiered data storage system comprising the new data, logic adapted to associate the temporary data set on the higher tier of the tiered data storage system with the existing data set on the lower tier of the tiered data storage system, and logic adapted to create a write indicator associated with the new data set indicating that the new data set belongs at the end of the existing data set.

In further embodiments, the system may include logic adapted to migrate the temporary data set to the lower tier of the tiered data storage system while maintaining the association with the existing data set, logic adapted to determine that a status indicator associated with the existing data set is set to migrated status, and/or logic adapted to determine that an indicator associated with the existing data set indicates that the existing data set is capable of adding new data to an end of the existing data set.

In another embodiment, the existing data set may be one of a partitioned data set (PDS), a physical sequential file, or a virtual storage access method (VSAM) file.

In a particularly preferred embodiment, the system logic is executed with the proviso that the existing data set is not moved to the higher tier of the tiered data storage system in order to write the new data.

Figure 5:
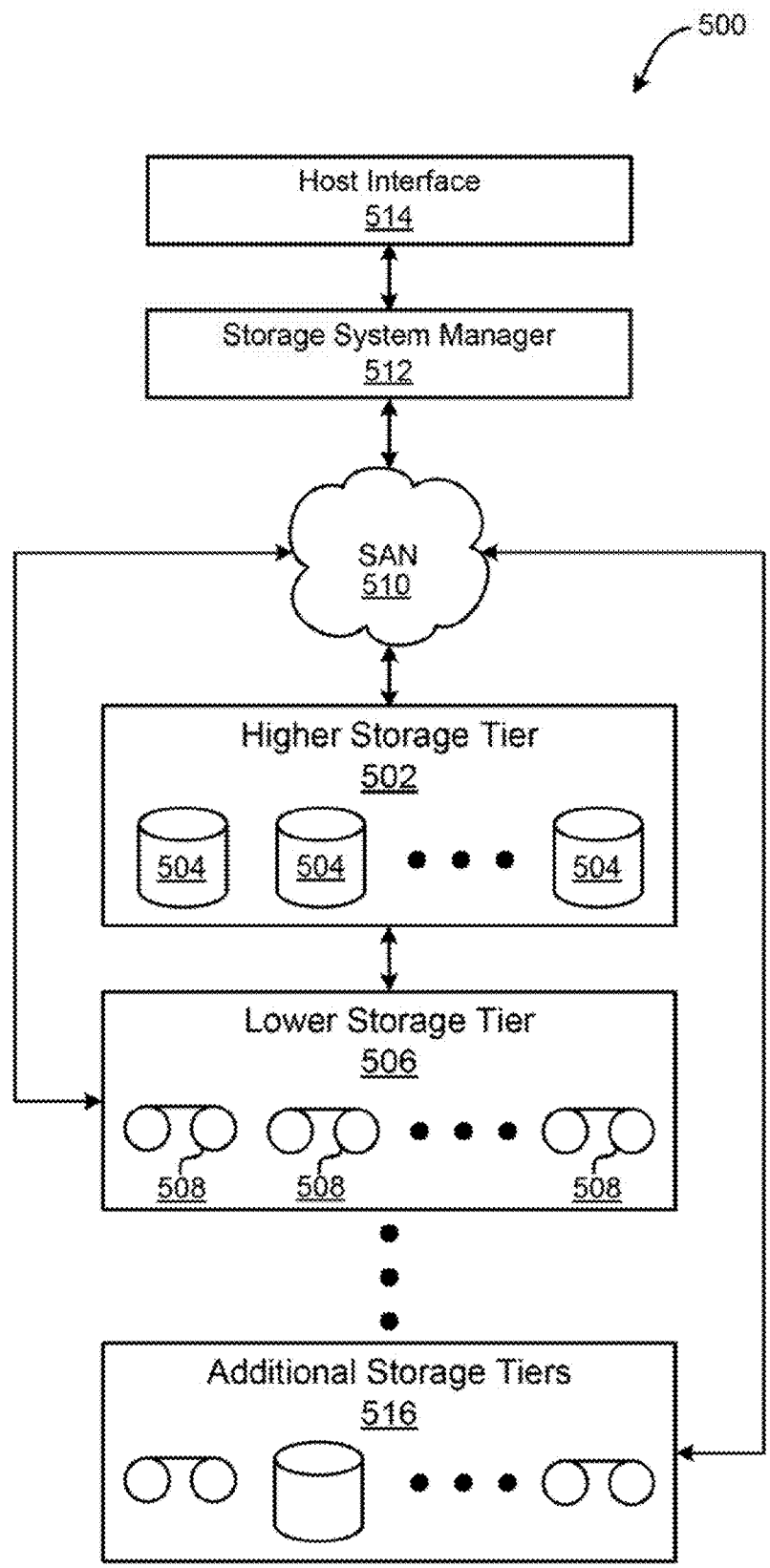
FIG. 5 illustrates a tiered data storage system, in accordance with one embodiment.

This system may include functionality, components, and/or elements as described according to FIG. 5, in one embodiment. However, the systems described herein are not so limited, and the system descriptions relating to FIG. 5 are for illustrative purposes only.

Figure 4:
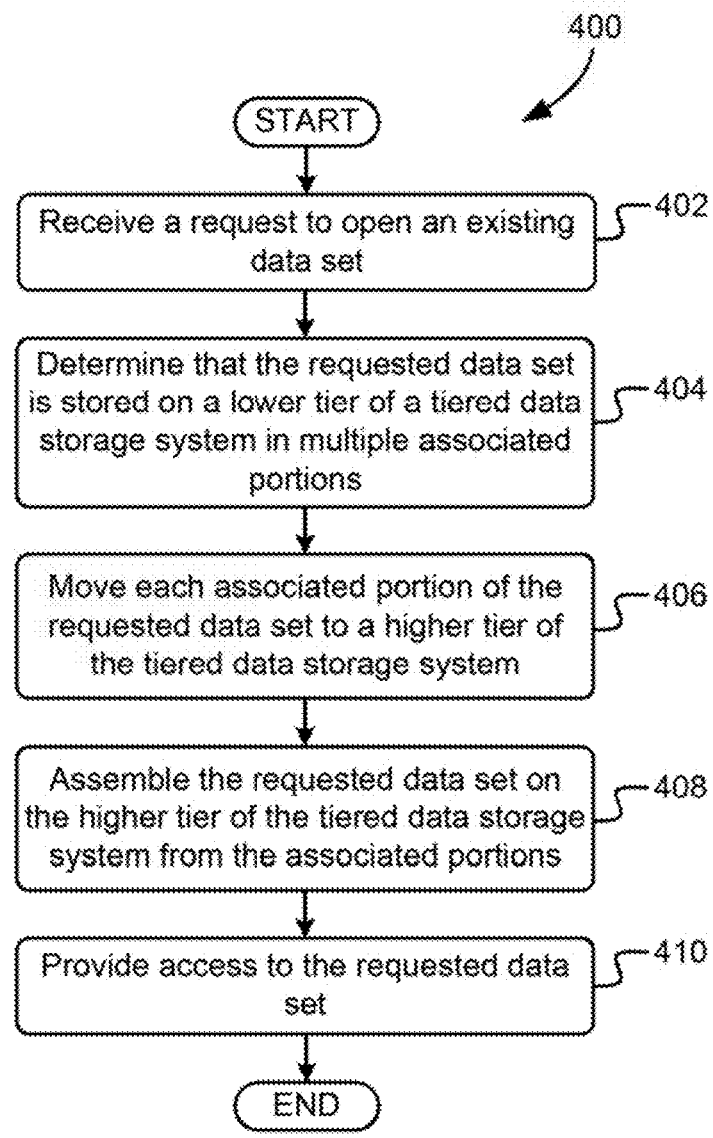
FIG. 4 is a flow diagram of a method for recalling a data set, according to one embodiment.

As shown in FIG. 4, in another embodiment, a method 400 for recalling a data set is shown according to one embodiment. Of course, the method 400 may include more or fewer operations than those described below and shown in FIG. 4, as would be apparent to one of skill in the art upon reading the present descriptions. Also, the method 400 may be performed in any desired environment, and may involve systems, components, etc., as described in regard to FIGS. 1-2, and 5 among others.

In one embodiment, the method 400 may be executed on a host system, a device, a management server, a library manager, etc., or any other system, server, application, or device as would be apparent to one of skill in the art upon reading the present descriptions.

In operation 402, a request to open a data set is received.

In operation 404, it is determined that the requested data set is stored to a lower tier of a tiered data storage system in multiple associated portions.

In operation 406, each associated portion of the requested data set is moved to a higher tier of the tiered data storage system.

In operation 408, the requested data set is assembled on the higher tier of the tiered data storage system from the associated portions.

In one embodiment, the method 400 may include providing access to the requested data set, as shown in optional operation 410.

Of course, the method 400 may be carried out using any system, device, etc.

Now referring to FIG. 5, a storage system 500 is shown according to one embodiment. Note that some of the elements shown in FIG. 5 may be implemented as hardware and/or software, according to various embodiments. The storage system 500 may include a storage system manager 512 for communicating with a plurality of media on a higher storage tier 502 and a lower storage tier 506. The higher storage tier 502 preferably may include one or more random access and/or direct access media 504, such as hard disks in hard disk drives (HDDs), nonvolatile memory (NVM), solid state memory in solid state drives (SSDs), etc., and/or others noted herein. The lower storage tier 506 may preferably include one or more sequential access media 508, such as magnetic tape in tape drives, optical media, etc., and/or others noted herein. Additional storage tiers 516 may include any combination of storage memory media. The storage system manager 512 may communicate with the storage media 504, 508 on the higher and lower storage tiers 502, 506 through a network 510, such as a storage area network (SAN), as shown in FIG. 5. The storage system manager 512 may also communicate with one or more host systems (not shown) through a host interface 514, which may or may not be a part of the storage system manager 512. The storage system manager 512 and/or any other component of the storage system 500 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 500 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 502, may include a majority of SSD storage media for storing data in a higher performing storage environment, and remaining storage tiers, including lower storage tier 506 and additional storage tiers 516 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 502, while data not having one of these attributes may be stored to the additional storage tiers 516, including lower storage tier 506. Of course, one of skill in the art, upon reading the present descriptions, may devise many other combinations of storage media types to implement into different storage schemes, according to the embodiments presented herein.

According to some embodiments, the storage system (such as 500) may include logic adapted to receive a request to open a data set, logic adapted to determine if the requested data set is stored to a lower storage tier 506 of a tiered data storage system 500 in multiple associated portions, logic adapted to move each associated portion of the requested data set to a higher storage tier 502 of the tiered data storage system 500, and logic adapted to assemble the requested data set on the higher storage tier 502 of the tiered data storage system 500 from the associated portions.

Of course, this logic may be implemented as a method on any device and/or system or as a computer program product, according to various embodiments.

In one embodiment, the system may include logic adapted to provide access to the requested data set.

As previously described a computer program product for updating an existing data set on a tiered data storage system may include a computer readable storage medium having computer readable program code embodied therewith. The computer readable program code includes, in one embodiment, computer readable program code configured to: receive a request to open an existing data set, the open indicating a write operation for the existing data set, receive new data to write to the existing data set, determine that the existing data set is stored on a lower tier of a tiered data storage system, determine that the existing data set is capable of being updated by appending the new data to an end of the existing data set, create a temporary data set on a higher tier of the tiered data storage system comprising the new data, associate the temporary data set on the higher tier of the tiered data storage system with the existing data set on the lower tier of the tiered data storage system, create a write indicator associated with the new data set indicating that the new data set belongs at the end of the existing data set, migrate the temporary data set to the lower tier of the tiered data storage system while maintaining the association with the existing data set, receive a request to open at least one of: the existing data set and the temporary data set, move the existing data set and the temporary data set to the higher tier of the tiered data storage system, and assemble the requested data set on the higher tier of the tiered data storage system from the existing data set and the temporary data set.

Of course, more or less functions may be performed by the computer program product, according to various embodiments. Additionally, any of the previously described embodiments and/or approaches may also be implemented in the computer program product.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system for recalling a data set, the system comprising logic integrated with and/or executable by a hardware processor, the logic being configured to:
   receive a request to open a data set;
   determine whether any portion of the requested data set is stored to a lower tier of a tiered data storage system in one or more non-contiguous portions or whether all of the data set is stored to a higher tier of the tiered data storage system;
   move each portion of the requested data set that are stored to the lower tier from the lower tier to the higher tier of the tiered data storage system when at least one portion of the requested data set is stored to the lower tier of the tiered data storage system; and
   assemble all portions of the requested data set into a single data set on the higher tier of the tiered data storage system to form the requested data set.

2. The system as recited in claim 1, wherein the logic is further configured to:
   determine that a status indicator associated with the requested data set is set to migrated status in order to determine that the at least one portion of the requested data set is stored to the lower tier of the tiered data storage system; and
   provide access to the requested data set on the higher tier of the tiered data storage system.

3. The system as recited in claim 1, wherein the requested data set is one of: a partitioned data set (PDS), a physical sequential file, or a virtual storage access method (VSAM) file.

4. The system as recited in claim 1, wherein the logic is further configured to:
   receive a request to write new data to the requested data set;
   determine that the requested data set is capable of being updated by appending the new data to an end of the requested data set;
   create a temporary data set on the higher tier of the tiered data storage system comprising the new data prior to moving each portion of the requested data set that is stored to the lower tier from the lower tier to the higher tier of the tiered data storage system;
   associate the temporary data set on the higher tier of the tiered data storage system with the portions of the requested data set that are stored to the lower tier of the tiered data storage system; and
   create a write indicator associated with the new data set indicating that the new data set belongs at the end of the portions of the requested data set that are stored to the lower tier of the tiered data storage system.

5. The system as recited in claim 4, wherein the logic is further configured to determine that an indicator associated with the requested data set indicates that the requested data set is capable of adding new data to an end of the requested data set, and wherein the existing data set is not moved to the higher tier of the tiered data storage system in order to write the new data.

6. The system as recited in claim 4, wherein the logic configured to assemble all portions of the requested data set is further configured to assemble the associated temporary data set with the portions of the requested data set that are stored to the lower tier of the tiered data storage system into the single data set to form the requested data set, and wherein the logic is further configured to migrate the portions of the requested data set that are stored to the lower tier of the tiered data storage system to the higher tier and the new data is written thereto when the portions of the requested data set that are stored to the lower tier of the tiered data storage system are not capable of being updated by appending the new data to the end of the portions of the requested data set that are stored to the lower tier of the tiered data storage system.

7. The system as recited in claim 1, wherein the portions of the requested data set that are stored to the lower tier of the tiered data storage system are stored to sequential access media that are incapable of having data amended to data already stored thereto.

8. A method for recalling a data set, the method comprising:
   receiving a request to open a data set;
   determining whether the requested data set is stored to a lower tier of a tiered data storage system in multiple associated portions or to a higher tier of the tiered data storage system;
   moving each associated portion of the requested data set from the lower tier to the higher tier of the tiered data storage system when at least one portion of the requested data set is stored to the lower tier of the tiered data storage system; and
   assembling the associated portions of the requested data set into a single data set to form the requested data set on the higher tier of the tiered data storage system.

9. The method as recited in claim 8, further comprising:
   determining that a status indicator associated with the requested data set is set to migrated status in order to determine that the at least one portion of the requested data set is stored to the lower tier of the tiered data storage system; and
   providing access to the requested data set on the higher tier of the tiered data storage system.

10. The method as recited in claim 8, further comprising migrating the existing data set to the higher tier and writing the new data thereto when the existing data set is not capable of being updated by appending the new data to the end of the existing data set, wherein the requested data set is one of: a partitioned data set (PDS), a physical sequential file, or a virtual storage access method (VSAM) file.

11. The method as recited in claim 8, further comprising:
receiving a request to write new data to the requested data set;
determining that the requested data set is capable of being updated by appending the new data to an end of the requested data set;
creating a temporary data set on the higher tier of the tiered data storage system comprising the new data prior to moving each associated portion of the requested data set from the lower tier to the higher tier of the tiered data storage system;
associating the temporary data set on the higher tier of the tiered data storage system with the associated portions of the requested data set on the lower tier of the tiered data storage system; and
creating a write indicator associated with the new data set indicating that the new data set belongs at the end of the existing data set.

12. The method as recited in claim 11, further comprising determining that an indicator associated with the requested data set indicates that the requested data set is capable of adding new data to an end of the requested data set, and wherein the existing data set is not moved to the higher tier of the tiered data storage system in order to write the new data.

13. The method as recited in claim 11, wherein the assembling the associated portions of the requested data set further comprises assembling the associated temporary data set with the associated portions of the requested data set into the single data set to form the requested data set.

14. The method as recited in claim 8, wherein the associated portions of the requested data set are stored to sequential access media of the lower tier of the tiered data storage system, the sequential access media being incapable of having data amended to data already stored thereto.

15. A computer program product for recalling a data set, the computer program product comprising a computer readable storage medium having program code embodied therewith, the program code readable and/or executable by a processor to:
receive a request to open a data set;
determine whether the requested data set is stored to sequential access media of a lower tier of a tiered data storage system in multiple, non-contiguous, associated portions or to a higher tier of the tiered data storage system, wherein the requested data set is incapable of being updated while residing on the sequential access media;
move each associated portion of the requested data set from the sequential access media of the lower tier to the higher tier of the tiered data storage system when at least one portion of the requested data set is stored to the sequential access media of the lower tier of the tiered data storage system; and
assemble the associated portions of the requested data set into a single data set to form the requested data set on the higher tier of the tiered data storage system.

16. The computer program product as recited in claim 15, wherein the program code is further readable and/or executable by the processor to:
determine that a status indicator associated with the requested data set is set to migrated status in order to determine that the at least one portion of the requested data set is stored to the lower tier of the tiered data storage system; and
provide access to the requested data set on the higher tier of the tiered data storage system.

17. The computer program product as recited in claim 15, wherein the requested data set is one of: a partitioned data set (PDS), a physical sequential file, or a virtual storage access method (VSAM) file.

18. The computer program product as recited in claim 15, wherein the program code is further readable and/or executable by the processor to:
receive a request to write new data to the requested data set;
determine that the requested data set is capable of being updated by appending the new data to an end of the requested data set;
create a temporary data set on the higher tier of the tiered data storage system comprising the new data prior to moving each associated portion of the requested data set from the lower tier to the higher tier of the tiered data storage system;
associate the temporary data set on the higher tier of the tiered data storage system with the associated portions of the requested data set on the lower tier of the tiered data storage system; and
create a write indicator associated with the new data set indicating that the new data set belongs at the end of the existing data set.

19. The computer program product as recited in claim 18, wherein the program code is further readable and/or executable by the processor to determine that an indicator associated with the requested data set indicates that the requested data set is capable of adding new data to an end of the requested data set, wherein the existing data set is not moved to the higher tier of the tiered data storage system in order to write the new data.

20. The computer program product as recited in claim 18, wherein the program code readable and/or executable by the processor to assemble the associated portions of the requested data set is further readable and/or executable to assemble the associated temporary data set with the associated portions of the requested data set into the single data set to form the requested data set, and wherein the program code is further readable and/or executable by the processor to migrate the existing data set to the higher tier and the new data is written thereto when the existing data set is not capable of being updated by appending the new data to the end of the existing data set.

* * * * *